United States Patent
Schmidtler et al.

(10) Patent No.: US 10,235,446 B2
(45) Date of Patent: Mar. 19, 2019

(54) SYSTEMS AND METHODS FOR ORGANIZING DATA SETS

(71) Applicant: Kofax, Inc., Irvine, CA (US)

(72) Inventors: Mauritius A. R. Schmidtler, Escondido, CA (US); Jan W. Amtrup, Silver Spring, MD (US); Stephen Michael Thompson, Oceanside, CA (US); Anthony Sarah, San Diego, CA (US)

(73) Assignee: KOFAX, INC., Irvine, CA (US)

( * ) Notice: Subject to any disclaimer, the term of this patent is extended or adjusted under 35 U.S.C. 154(b) by 0 days.

(21) Appl. No.: 15/666,409

(22) Filed: Aug. 1, 2017

(65) Prior Publication Data

US 2017/0329838 A1 Nov. 16, 2017

Related U.S. Application Data

(60) Division of application No. 15/422,435, filed on Feb. 1, 2017, now Pat. No. 9,754,014, which is a continuation of application No. 13/655,267, filed on Oct. 18, 2012, now abandoned, which is a continuation of application No. 12/826,536, filed on Jun. 29, 2010, now Pat. No. 8,321,477, which is a division of application No. 12/042,774, filed on Mar. 5, 2008, now Pat. No. 9,082,080.

(51) Int. Cl.
*G06F 17/30* (2006.01)
*G06N 99/00* (2019.01)

(52) U.S. Cl.
CPC .... *G06F 17/30598* (2013.01); *G06F 17/3053* (2013.01); *G06F 17/30312* (2013.01); *G06N 99/005* (2013.01)

(58) Field of Classification Search
CPC ......... G06F 17/30598; G06F 17/30312; G06F 17/3053; G06F 17/30705; G06N 99/005
See application file for complete search history.

(56) References Cited

U.S. PATENT DOCUMENTS

| | | | | |
|---|---|---|---|---|
| 6,675,159 | B1 * | 1/2004 | Lin | G06F 17/2705 |
| 9,690,771 | B2 * | 6/2017 | Tremblay | G06F 17/271 |
| 2002/0116174 | A1 * | 8/2002 | Lee | G06F 17/30707 704/9 |
| 2004/0024739 | A1 * | 2/2004 | Copperman | G06F 17/30616 |
| 2004/0030723 | A1 * | 2/2004 | Gerstl | G06F 17/30707 |
| 2009/0228499 | A1 * | 9/2009 | Schmidtler | G06N 99/005 |
| 2017/0140030 | A1 * | 5/2017 | Schmidtler | G06N 99/005 |

OTHER PUBLICATIONS

Barros et al., A Survey of Evolutionary Algorithms for Decision-Tree Induction, May 2012, 22 pages (Year: 2012).*

* cited by examiner

*Primary Examiner* — Noosha Arjomandi
(74) *Attorney, Agent, or Firm* — Zilka-Kotab, P.C.

(57) ABSTRACT

According to one embodiment, a computer-implemented method for cleaning up a data set having a possible incorrect label includes: selecting a plurality of training documents; estimating a quality of an organization of a plurality of categories; and determining whether the quality of the organization is greater than a predetermined quality threshold. Corresponding system and computer program product embodiments are also presented. Other aspects and advantages of the present invention will become apparent from the following detailed description, which, when taken in conjunction with the drawings, illustrate by way of example the principles of the invention.

20 Claims, 8 Drawing Sheets

SYSTEMS AND METHODS FOR ORGANIZING DATA SETS

FIELD OF THE INVENTION

The present invention relates to decision making systems, and more particularly to data used in decision making systems.

BACKGROUND

Many algorithms in the field of document transformation are based on learning the statistic regularities of a training set and applying those regularities to unseen documents, for instance to determine the document type. Those learning algorithms typically require a significant amount of training data labeled with the correct decisions. For instance, in the case of automatic document classification, a number of documents for each category would be prepared, so that the algorithm can learn to associate aspects of the documents with their category.

In many situations, verification of the correctness of the training data may be performed to ensure the high quality (and thus success) of the application of learning algorithms. Currently, this verification proceeds manually. For example, an experienced user who has knowledge of all possible categories may inspect one document at a time and may correct its label if a mistake is present.

All current processes used to create and verify training data are very time- and cost-intensive, usually requiring experts in the subject matter to label examples. Additionally, if a hierarchy of document types is large, correcting the label of an example requires a significant cognitive effort, since the details of sometimes several hundreds of categories need to be recalled. Furthermore, manual labeling and verification usually produce many more training examples than are strictly necessary, since it cannot be determined when the training data is of sufficient quality and quantity for a statistical classifier to operate with sufficient performance.

There is thus a need for addressing these and/or other issues associated with the prior art.

SUMMARY

According to one embodiment, a computer-implemented method for cleaning up a data set having a possible incorrect label includes: selecting a plurality of training documents; estimating a quality of an organization of a plurality of categories; and determining whether the quality of the organization is greater than a predetermined quality threshold.

Corresponding system and computer program product embodiments are also presented.

Other aspects and advantages of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

Figure 1:
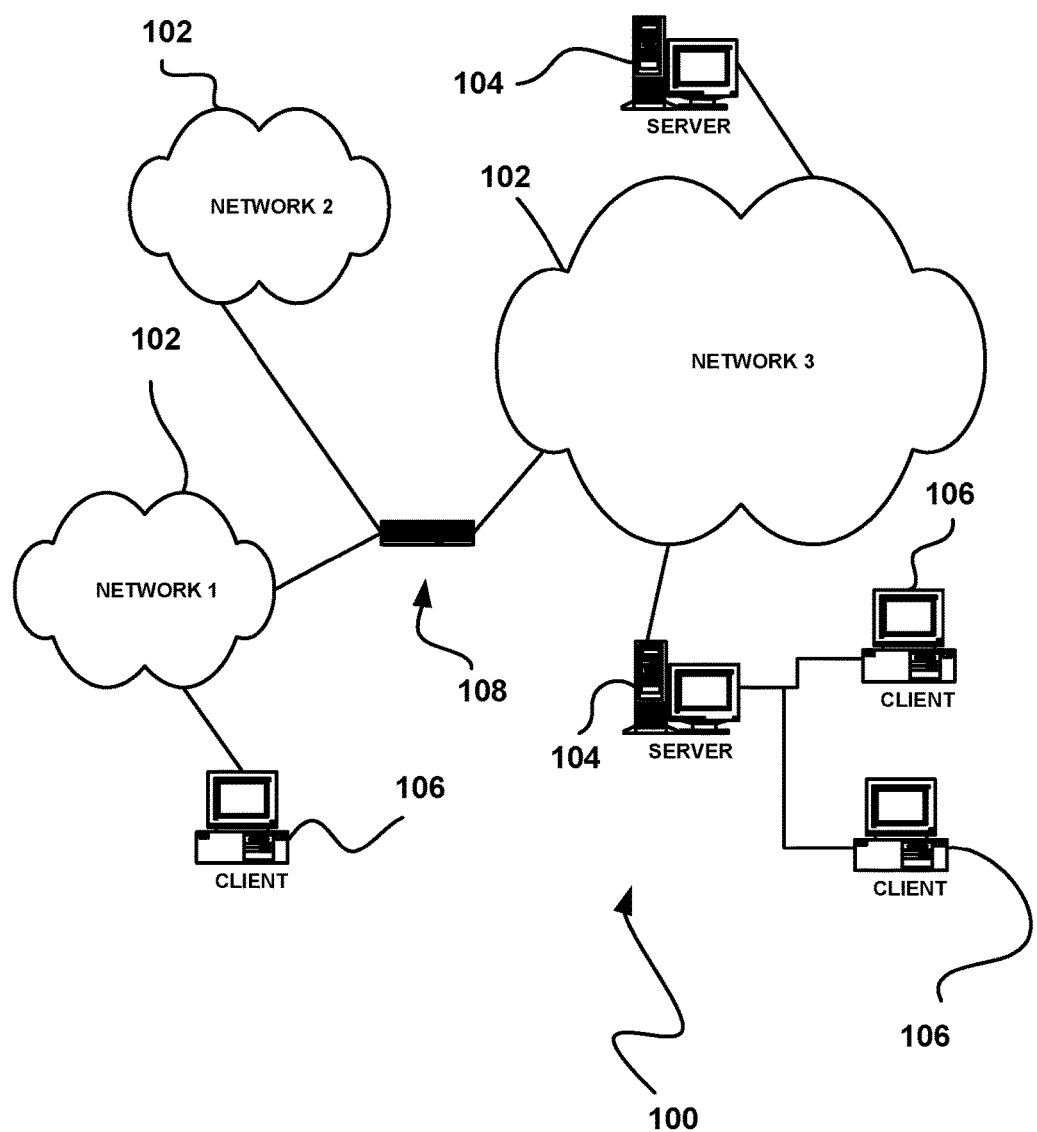
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
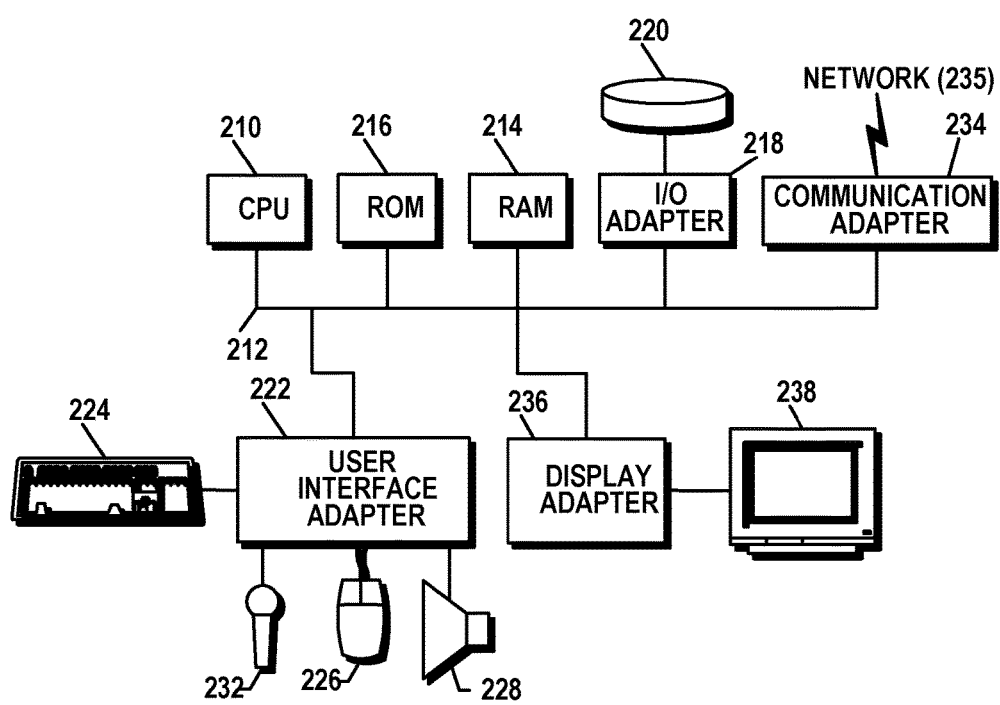
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

One embodiment of the present invention is related to improvements in the setup of business process automation (BPA) solutions. Typically, the first step required to use BPA applications is to consume, classify, possibly separate, and to transform (e.g. by extracting relevant pieces of information) incoming business communications, be they in electronic form (e-mail, electronic documents of various sorts) or in physical form (incoming paper documents that are being scanned and on which optical character recognition (OCR) may be performed).

Another embodiment simplifies and facilitates the labeling of training data for learning algorithms by providing relevant examples to the user and by allowing the user to focus on one particular area of interest at a time. The level of technical expertise needed to perform the task may be greatly reduced. One embodiment of the invention disclosed herein deals with the example of classifying documents into categories. Of course, however, the description of the process also applies to other transformation processes, including, but not limited to, document separation, information extraction, etc.

One embodiment of the present invention further improves the quality of a data set and the workflow for verification of existing hierarchies and for the construction of new hierarchies in several ways. First, it allows the user to concentrate on one category at a time, rather than on a multitude of categories simultaneously. This presents a significant improvement since the cognitive load for the user is drastically reduced. Instead of selecting one category out of potentially hundreds of categories, the decision to be made is merely whether or not a document belongs in some category. Additionally, it presents documents in a way to maximize the utility of the documents being labeled or verified, and to maximize the ease of operation for the user. Also, it can be used both for the verification of an existing hierarchy or the creation of a new hierarchy by requiring only a minimal amount of data to start the process. Further, the system is able to diagnose itself, detecting suboptimal data quality, and is able to automatically modify its operation to increase performance. Further still, users without technical expertise are able create highly accurate solutions.

Figure 3:
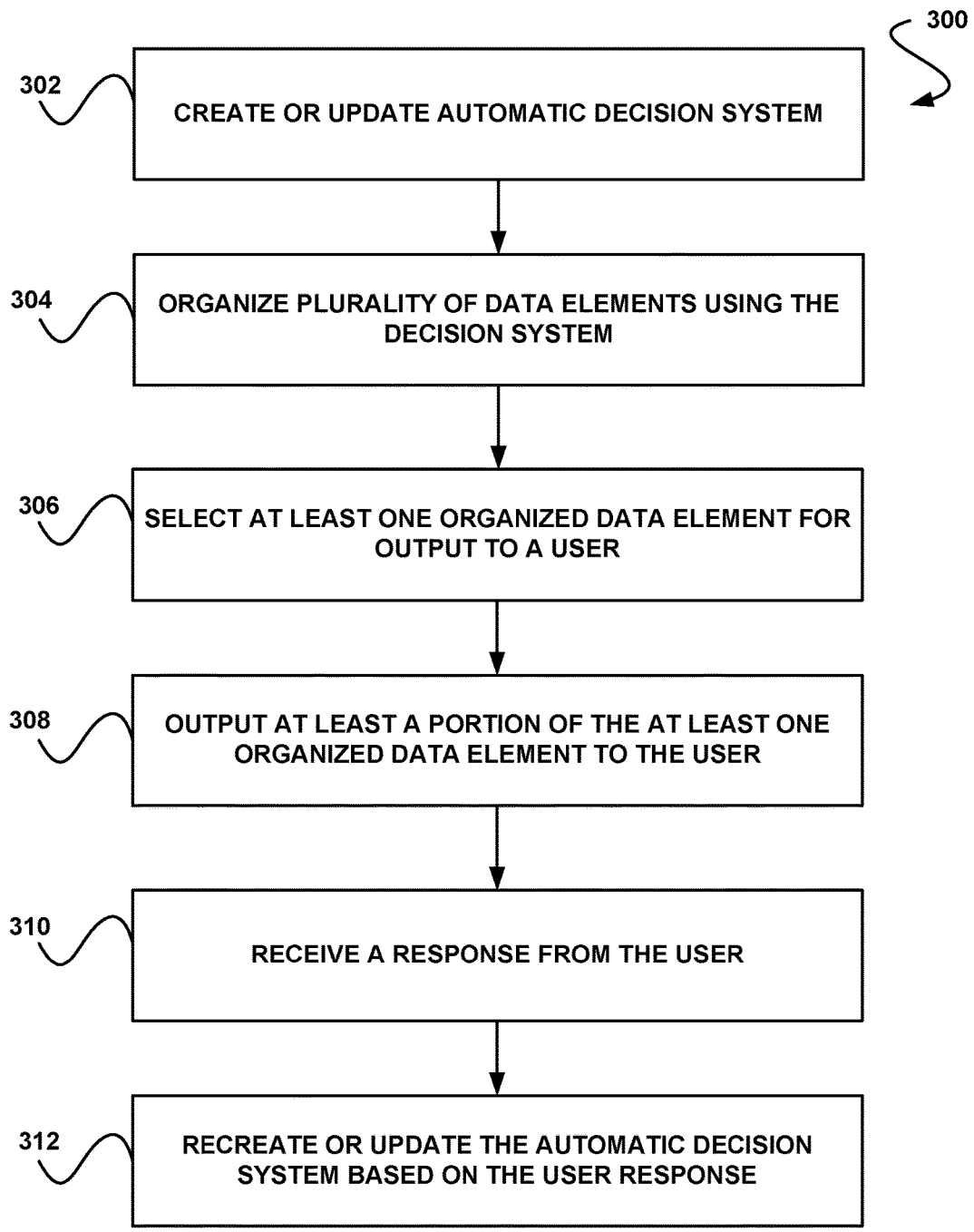
FIG. 3 shows a method for organizing data sets, in accordance with one embodiment.

FIG. 3 shows a method 300 for organizing data sets, in accordance with one embodiment. As an option, the method 300 may be carried out in the context of the architecture and environment of FIGS. 1 and/or 2. Of course, however, the method 300 may be carried out in any desired environment.

As shown in operation 302, an automatic decision system is created or updated for determining whether data elements fit a predefined organization or not, where the decision system is based on a set of preorganized data elements. Additionally, in operation 304 a plurality of data elements are organized using the decision system.

Further, in operation 306, at least one organized data element is selected for output to a user based on a score or confidence from the decision system of the at least one organized data element. Further still, in operation 308, at least a portion of the at least one organized data element is output to the user.

In addition, in operation 310 a response is received from the user comprising at least one of a confirmation, modification, and a negation of the organization of the at least one organized data element. Furthermore, in operation 312 the automatic decision system is recreated or updated based on the user response.

In a particularly preferred embodiment, the process of creating or updating the automatic decision making system, organizing data elements, selecting data elements for inspection, and manually confirming or correcting the automatically derived organization continues, and in the end results in a data set that is fully organized.

Figure 4:
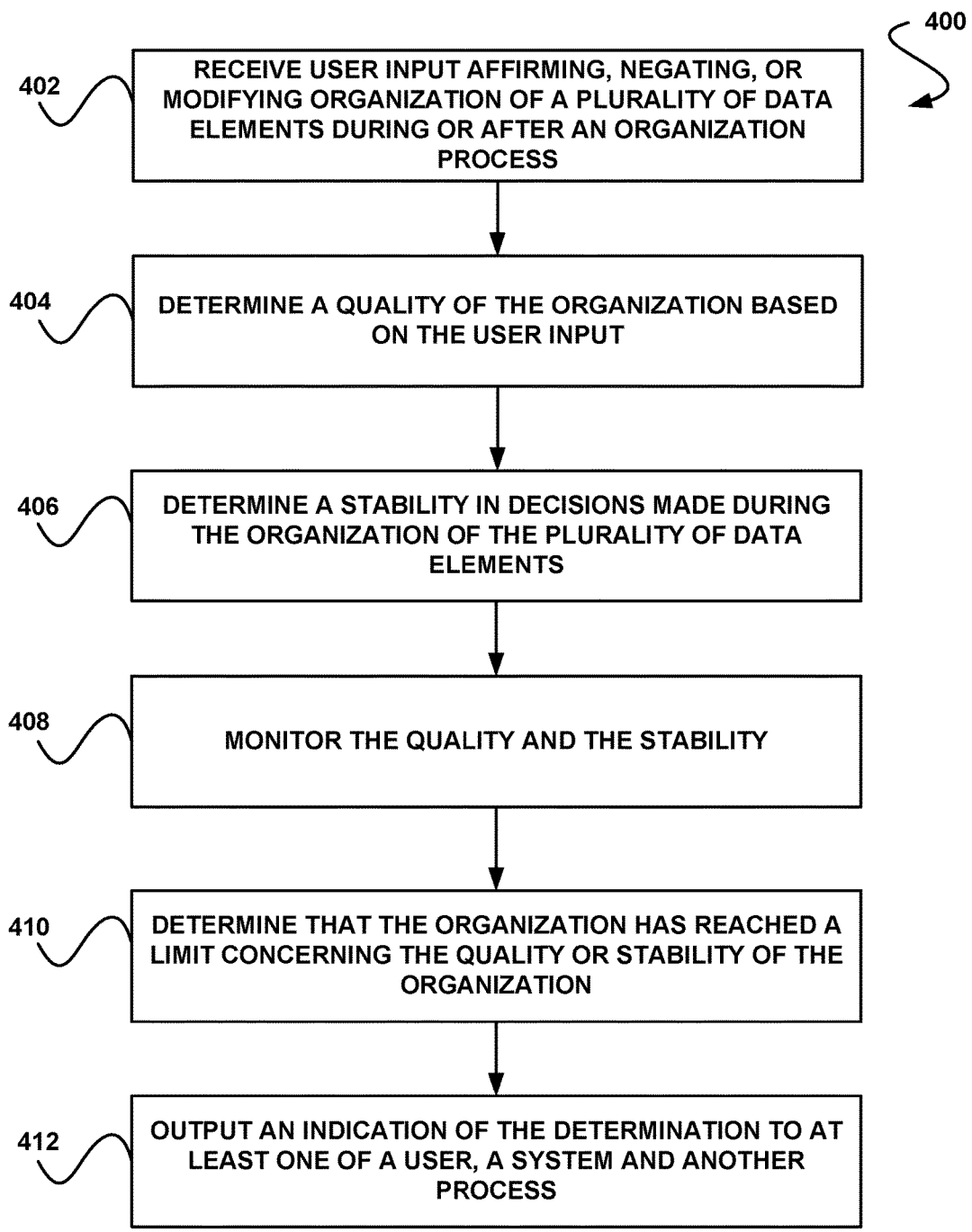
FIG. 4 shows a method for detecting limits to the quality in a dynamic organization process, in accordance with another embodiment.

FIG. 4 illustrates a method 400 for detecting limits to the quality in a dynamic organization process, in accordance with one embodiment. As an option, the method 400 may be implemented in the context of the architecture and environment of FIGS. 1-3. Of course, however, the method 400 may be implemented in any desired environment. Yet again, it should be noted that the aforementioned definitions may apply during the present description.

As shown in operation 402, user input affirming, negating, or modifying organization of a plurality of data elements is received during or after an organization process. Additionally, as shown in operation 404, a quality of the organization is determined based on the user input.

Further, as shown in operation 406, a stability in decisions made during the organization of the plurality of data elements is determined. Further still, as shown in operation 408, the quality and the stability are monitored.

In addition, as shown in operation 410, it is determined that the organization has reached a limit concerning the quality or stability of the organization by evaluating the quality and stability of the organization over a period of time or number of cycles. Also, as shown in operation 412, an indication of the determination is output to at least one of a user, a system and another process.

In the context of the present description, the automatic decision system may include any system capable of determining whether data elements fit a predefined organization or not. In one embodiment, the automatic decision system may include a classifier. For example, the automatic decision system may include a binary classifier. In another embodiment, the automatic decision system may include a support vector machine (SVM).

Support vector machines (SVMs) are a set of related supervised learning methods used for classification and regression. They belong to a family of generalized linear classifiers. They can also be considered a special case of Tikhonov regularization. A special property of SVMs is that they simultaneously minimize the empirical classification error and maximize the geometric margin. Hence they are also known as the maximum margin classifier.

In still another embodiment, the automatic decision system may include a search engine. For example, the automatic decision system may include a search algorithm, a nearest neighbor classifier, etc. In yet another embodiment, the automatic decision system may include a regression system. For example, the automatic decision system may include a linear or non-linear regression system.

Furthermore, the predefined organization may include any predefined arrangement of the data elements. In one embodiment, the predefined organization may include a multi-tiered or multi-class organization system. In another embodiment, the predefined organization may include a multi-class classification system. In still another embodiment, the predefined organization may include a multi-label labeling system. In yet another embodiment, the predefined organization may include a binary classification system.

In the context of the present description, data elements may include any elements of data. For example, data elements may include one or more images, documents, portions of a document, etc. In another embodiment, creating or updating the automatic decision system may be based on an organization provided in the set of preorganized data elements.

Additionally, the set of preorganized data elements may include one or more data elements that are organized, classified, labeled, etc. in any manner. For example, one or more data elements may be manually organized by a user. In another example, the organization for creating or updating the automatic decision system is based on a clustering of an originally unorganized data set.

In another embodiment, the preorganized data elements may include one or more training data elements. Illustrative training data may exist in the form of previously established and archived data, for instance a document type hierarchy that was used to store documents in some form of database (e.g. a document management system, etc.). In other cases, for new hierarchies, or if no electronic repository was available, documents may be gathered manually and manually labeled with the proper category.

In another embodiment, organizing the plurality of data elements may include labeling the data elements, classifying the data elements, categorizing the data elements, etc. For example, the decision system may organize a plurality of documents into one or more predefined document categories. In another example, the data elements may be documents and the organization may be given by an assignment of documents to categories based on the content of the documents.

In still another embodiment, the data elements may be elements within a document, and the organization may be given by an assignment of labels to the elements based on the function of the elements in the document. For example, a portion of a form or document (e.g., a name, social security number (SSN), date, etc.) may be retrieved via data extraction from one or more forms or documents. In still another example, metadata may be attached to one or more portions of the data elements. Data extracted from the portion of the form or document may be labeled with metadata that is used to organize the data.

Further, in one embodiment, the plurality of data elements may be organized using a classification system. For example, the plurality of data elements may be placed into one or more groups/buckets/classes/etc. based on quantitative information on one or more characteristics inherent in the data elements (referred to as traits, variables, characters, etc.) and based on a the set of preorganized data elements.

In another embodiment, the plurality of data elements may be organized using a nearest neighbor system. For example, the automatic decision system may take the plurality of data elements as input and return one or more elements that have a value closest to a predetermined value, farthest away from a predetermined value, between two predetermined values, etc.

In still another embodiment, the plurality of data elements may be organized using a regression system. Of course, however, the plurality of data elements may be organized using the decision system in any manner.

In yet another embodiment, the score or confidence of the at least one organized data element may be returned automatically from the regression system. For example, the regression system may take the data elements and return a real value for one or more of the data elements, such as a number or score indicative of how well the data element matches one or more aspects or categories of the predefined organization.

In still another embodiment, the score or confidence of the at least one organized data element may be returned from an ancillary process. For example, the classifier may return a categorical result to the ancillary process, and the ancillary process may use the scores from the classifier to return a score or confidence. Of course, however, the score or confidence of the at least one organized data element may be returned in any manner.

Further still, in one embodiment, the at least one organized data element may be selected for output based on having a decision score or confidence above a predetermined value. For example, a document with a high confidence may be output to the user to affirm the classification of the document.

In another embodiment, the at least one organized data element may be selected for output based on having a decision score or confidence below a predetermined value. For example, a document with a low confidence may be output to the user to affirm the rejection of the document from a particular classification.

In still another embodiment, the at least one organized data element may be selected for output based on having a decision score or confidence between predetermined values. For example, a document with a medium confidence may be output to the user to determine whether the document should be accepted or rejected from a particular classification.

In still yet another embodiment, the at least one organized data element may be selected for output based on having a decision score or confidence indicating that a process of organizing the data element was more difficult relative to one or more of the other data elements. For example, a document with a score indicating that the document is near a classification boundary may be output to the user to determine whether the document should be accepted or rejected from a particular classification. In this way, data elements that may prove difficult for the decision system to classify may be brought to the attention of the user.

Further, at least a portion of the at least one organized data element may be output to the user in any manner. For example, the at least a portion of the at least one organized data element may be output to a display device 238 as shown in FIG. 2.

In one embodiment, a portion of the at least one organized data element may be output to the user. For example, the front page of a document may be output. In another example, only the sections of the document containing metadata may be output. In another embodiment, all of the at least one organized data element may be output to the user. For example, an entire document may be output to the user.

In still another embodiment, more than the at least one organized data element may be output to the user. For example, the entire page where an extracted data element is found may be output. In another example, a different data element that has a relationship to the at least one organized data element may be output to the user. In still another example, an entire page of a document may be output to the user with two elements of the page highlighted in order to assist the user in determining which element is appropriately classified (e.g., as an SSN, name, date, etc.).

Further still, in another embodiment, the response may be received from the user via any type of communications interface. For example, the response may be received from the user via a keyboard 224, a mouse 226, a microphone 232, and/or any other user interface devices (e.g. a touch screen) as shown in FIG. 2.

In another embodiment, the confirmation of the organization of the at least one organized data elements may include a binary response. For example, the confirmation may include a YES response indicating that the at least one organized data elements are correctly organized.

In yet another embodiment, the negation of the organization of the at least one organized data elements may include a binary response. For example, the confirmation may include a NO response indicating that the at least one organized data elements are incorrectly organized. In this way, the user may easily respond regarding the organization of the at least one organized data elements.

In still another embodiment, the modification of the organization of the at least one organized data elements may include any organizational modification. For example, the automatic decision system may classify a document belonging in an appraisal category. Additionally, the document may be output to the user, and the user may identify the document as a mortgage document. As a result, the response received from the user may comprise a modification of the document classification indicating that the document should belong in a mortgage category.

Also, in one embodiment, if the user response is a confirmation, the at least one organized data element may be used as a positive example for recreating or updating the decision system. In another embodiment, if the user response is a negation or modification, the at least one organized data element may be used as a negative example for recreating or updating the decision system.

In another embodiment, at least a portion of the plurality of data elements may be reorganized after recreating or updating the decision system. In still another embodiment, one or more new data elements may be organized after recreating or updating the decision system. For example, the recreated or updated automatic decision system may be deployed in a production system where it may be used to categorize new, unseen documents. In still another embodiment, the updated automatic decision system may be used to organize at least some of the plurality of data elements in addition to one or more new data elements. In this way, improvements in organization may be achieved based on user feedback.

Furthermore, in one embodiment, the user input may be received in real time. In another embodiment, the user input may be a result of a random selection of data elements from the plurality of data elements. In still another embodiment, the user input may be a result of a manual selection of data elements from the plurality of data elements. In yet another embodiment, the user input may be a result of a selection of data elements from the plurality of data elements based on the score or confidence of the data elements. For example, the user may first select data elements having a high confidence and may later select data elements having a lower confidence.

In the context of the present embodiment, the organization process may be any process used to organize the plurality of data elements. In one embodiment, the organization process may be a looped process. For example, the user may affirm, negate, or modify one or more data elements chosen from the plurality of data elements. Additionally, the plurality of data elements may be reorganized based on this user input, and the user may again affirm, negate, or modify one or more data elements chosen from the plurality of reorganized data elements in a loop until a predetermined event occurs.

In another example, at least portions of the data elements may be output to the user during the organization process, and the quality may be updated each time user input is received.

In the context of the present description, the quality of the organization may include any measure of performance of the dynamic organization process. For example, the quality may include error rate of the organization, precision of the organization, recall of the organization, etc. In yet another embodiment, the quality and the stability may be monitored during the dynamic organization process.

Further, in one embodiment, the determination may be that the quality of the organization is not likely to significantly change if the quality and stability do not change by more than a predetermined amount over a given amount of time. For example, the user may affirm the organization of the plurality of data elements over a predetermined period of time or number of cycles. In another embodiment, the determination may be that the organization process is having difficulty in handling the data if the quality and stability oscillate over time. Of course, however, the quality and stability of the organization may be evaluated in any manner. Additionally, in one embodiment, the period of time may be arbitrary, predefined, random, etc.

Further still, in one embodiment, outputting the indication of the determination may include outputting a visual display, an audible alert, an electronic mail message, or any other output. Additionally, the limit that is reached may be output. In another embodiment, different decision functions than currently being used for organization may be implemented upon determining that the organization process has reached a limit.

In still another embodiment, an input or its representation used during the organization may be changed upon determining that the organization process has reached a limit. For example, the value of the input may be changed. In another example, the notation used in representing the input may be changed.

In yet another embodiment, the organization of data elements may be altered upon determining that the organization process has reached a limit. Further, altering the organization of data elements may include combining data elements from at least two aspects of the organization into a new single aspect. Also, in a second organization process, the data elements in the new single aspect may be separated back into the at least two aspects. For example, one or more categories used in the organization process may be added or removed. In another example, if many data elements are determined to be grouped into a particular category, that category may be divided into multiple categories.

One embodiment of the method and apparatus of the present invention may be used to improve the quality of training data for statistical decision making systems, or to create such training data from a set of unlabeled examples. One objective of various embodiments of the present invention may be to train a decision making system on a small training set, to organize other, possibly unlabeled examples, and to select new relevant examples for confirmation by a user from the set of organized examples. In another embodiment, the method may be used within the context of transformation applications designed to support BPA systems. Examples of transformation processes in the current context include document classification, document separation, information extraction, etc.

In yet another embodiment, by focusing on few relevant examples and a single aspect of organization from a potentially large number of organization aspects, the system may lower the cognitive load of a user, making manual labeling oftentimes a binary decision as to whether an example is a member of a specific organizational aspect or not, which may enhance the quality of the labeling and the speed with which it is achieved.

Still another embodiment is also self-diagnosing, in that it may be possible to detect difficult organizational categorizations during the process of providing training samples. The system may then automatically change its behavior to improve performance even in the presence of difficult data. The modifications may be transparent to the user who is not required to have deep technical insight into the design of the system.

One embodiment of the present invention organizes data sets by means of an automatic decision making system. In one preferred embodiment, the data set may comprise one or more electronic documents. The documents may be electronic documents, or they may be physical documents imported into an electronic system, e.g. by means of scanning and OCR. Additionally, the organization of the documents may be a hierarchy of categories. Each document belongs to one category within the hierarchy. One goal of the process supported by various embodiments of the present invention may be to either create category labels for each document in case the documents in the data set were not labeled previously, or to confirm or modify category labels for documents such that the labeling in the resulting data set is more consistent than before.

In another embodiment, the data set may contain one or more documents, and the labels may determine where the boundaries between documents are. One goal may be to either add boundary positions where none existed previously, or to ensure that most or all boundary positions are correct.

In another embodiment, the data set may contain pieces of information extracted from documents, and the labels of those information pieces may denote the label (or meaning) of these pieces of information or fields. One goal may be to either create a labeling for fields for the purpose of creating a training set for a statistical information extraction system, or to ensure a high level of consistency and correctness of such labeling in order to increase the performance of such information extraction systems.

It is important to note that the embodiments described herein are just samples of a large class of possible applications of the various embodiments of the present invention. In this following embodiment, the example of documents and their labels in a categorization hierarchy are used.

Figure 5:
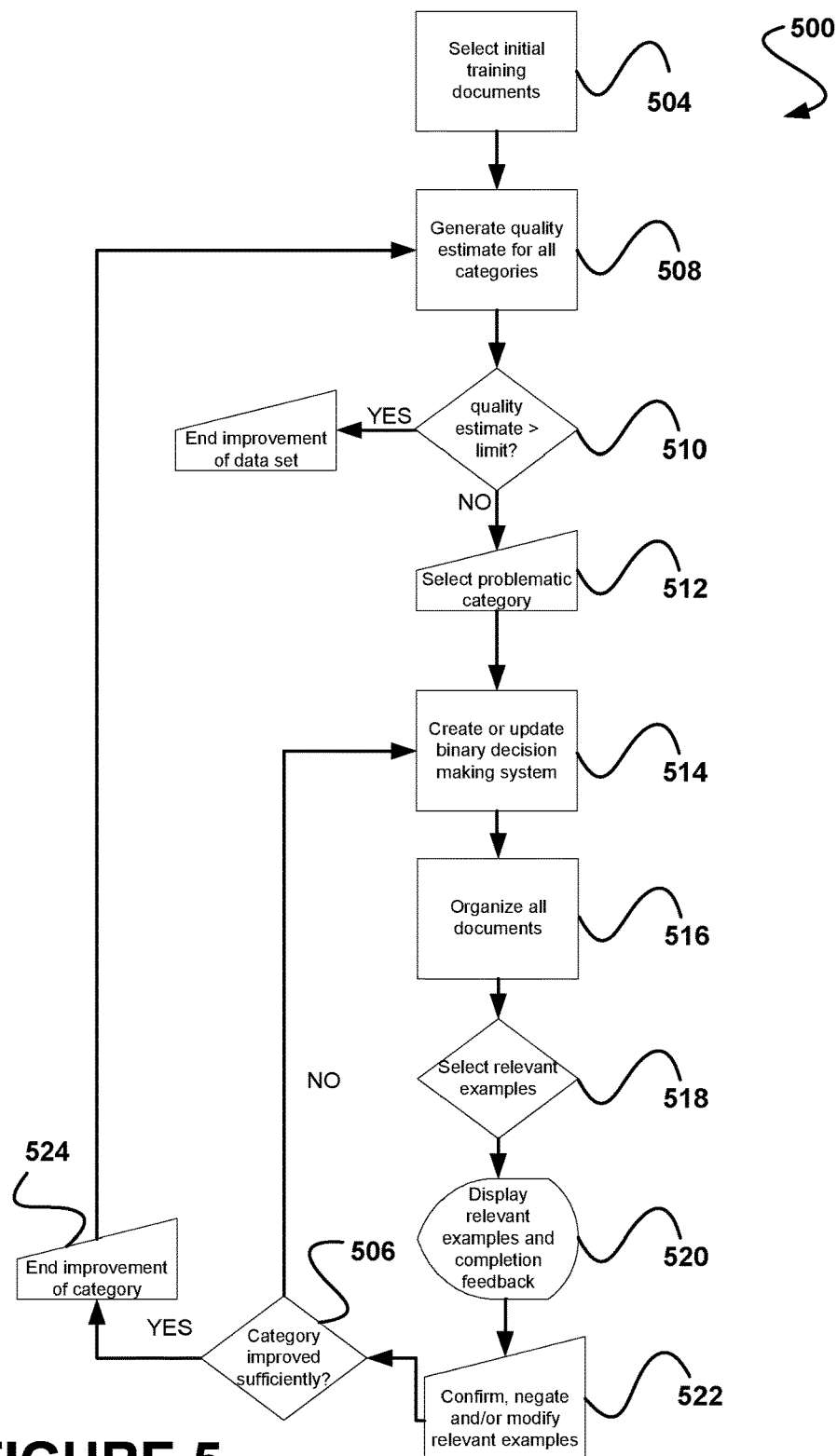
FIG. 5 shows a method for cleaning up a data set with a possible incorrect label, in accordance with yet another embodiment.

FIG. 5 illustrates a method 500 for cleaning up a data set with a possible incorrect label, in accordance with yet another embodiment. As an option, the method 500 may be implemented in the context of the architecture and environment of FIGS. 1-4. Of course, however, the method 500 may be implemented in any desired environment. Yet again, it should be noted that the aforementioned definitions may apply during the present description.

As shown in operation 504, initial training documents are selected. These documents may include already labeled documents, preselected training documents, etc. Additionally, in operation 508 a quality estimate is generated for all categories. Further, in decision 510 it is determined whether the quality estimate is greater than a predetermined limit.

If it is determined in decision 510 that the quality estimate is greater than a predetermined limit, then the method exits. However, if in decision 510 it is determined that the quality estimate is not greater than a predetermined limit, in operation 512 a problematic category is selected. Additionally, in operation 514 a binary decision making system is created or updated for that category.

Further, in operation 516 all documents in the category are organized. In operation 518 relevant examples are selected, and in operation 520 the relevant examples and completion feedback are displayed. Further still, in operation 522 the relevant examples are confirmed, negated, and/or modified.

In decision 506 it is determined whether the category has been sufficiently improved. If it is determined in decision 506 that the category has not been sufficiently improved, then in operation 514 the binary decision making system is created again. However, if it is determined in decision 506 that the category has been sufficiently improved, then in operation 524 the improvement of the category is ended.

Figure 6:
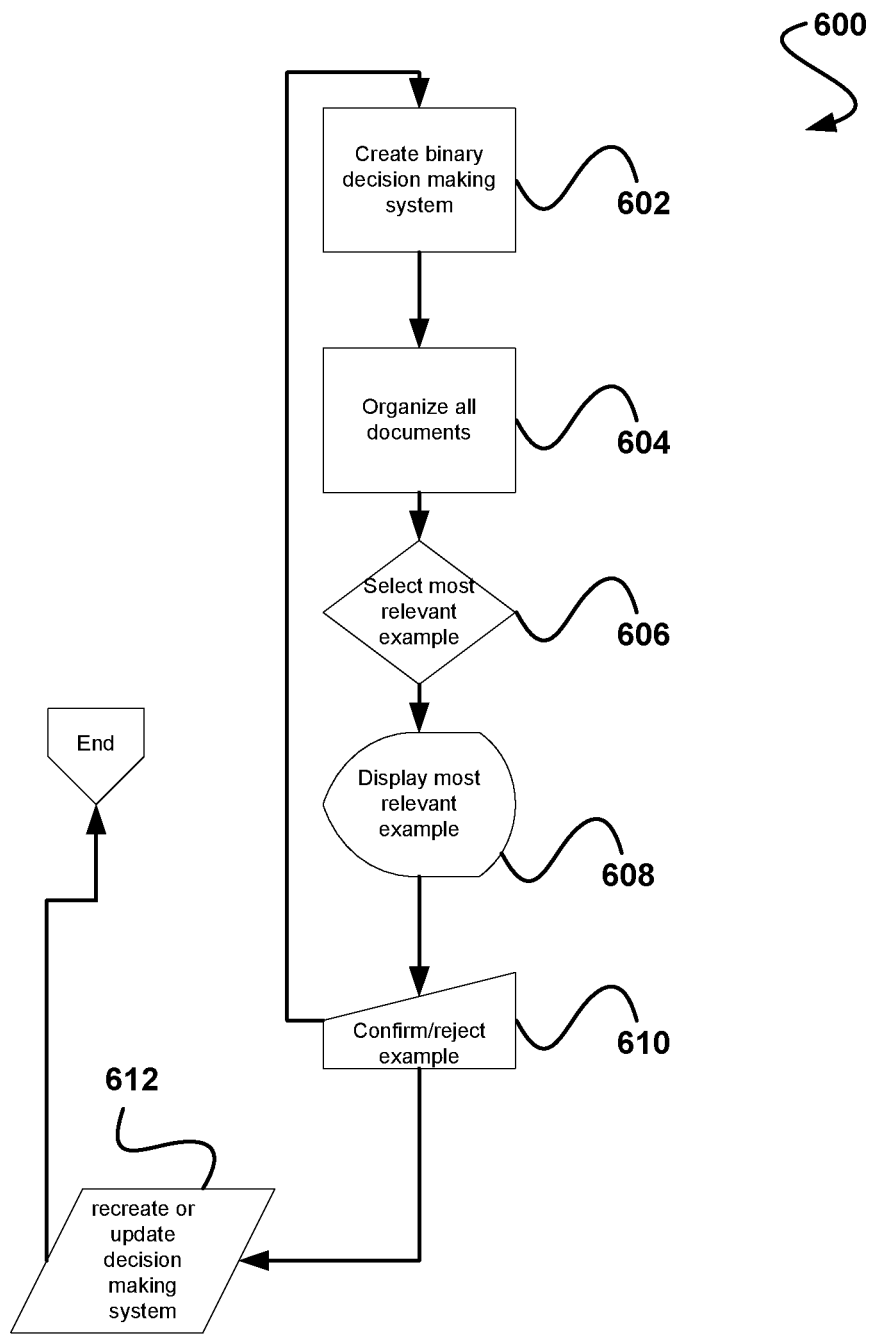
FIG. 6 shows a method for organizing data sets, in accordance with yet another embodiment.

FIG. 6 illustrates a method 600 for organizing data sets, in accordance with still another embodiment. As an option, the method 600 may be implemented in the context of the architecture and environment of FIGS. 1-5. Of course, however, the method 600 may be implemented in any desired environment. Yet again, it should be noted that the aforementioned definitions may apply during the present description.

In one embodiment, the first step in the process or organizing this data set may be to create an automatic decision system that is able to determine whether or not data elements fit the organization or not. See operation 602. This means that an automatic decision system may be created that is able to determine whether or not a document seems to be labeled with the correct category or not.

Initially, the data set may or may not have category labels for documents, and the confidence that one can have in such labeling, if it exists, may vary, depending on the confidence in the manual processes used to establish such labels. In the context of the present embodiment, any decision system may be used. It may be a simple binary classifier (for instance based on SVMs), but nearest neighbor classifiers, regression systems, or search algorithms may fulfill the same function. Additionally, the decision making process, however, may attach a confidence or score to its decisions, indicating the confidence with which an organization decision has been reached. It is immaterial whether or not the delivery of this confidence or score is an integral part of the decision making, or whether it is the result of an ancillary process.

If the documents in the data set have labels attached to them derived from previous (probably manual) processes, those labels may serve as the organization from which the automatic decision system is created. In the first loop of the iterative process, a user may decide not to use all of the labeled data, but only several representative samples for each category; for instance, a few documents for each category that are closest by some measurement to the center of the category.

In the case where no pre-assigned labels exist, an initial organization (which may by changed during the course of the process) may be established by clustering the documents in the data sets into groups of documents that are similar to each other in some sense. For instance, a representation for a document may be a vector whose elements are the frequencies of words used in the document, and the clustering may use the Euclidean distance in the thusly created vector space of documents. Clustering may be done by any suitable method, for instance partitional clustering using the g-means algorithm, by an agglomerative method, etc.

The resulting automatic decision system may then be used to organize elements of the data set. See operation 604. The elements being organized may or may not be the same ones being used to create or update the decision system. For example, a set of documents maybe categorized. The results of the categorization may include scores or confidences that reflect how well the decision system thinks the data elements match the organization that was created.

The system may then select one or more of the organized data elements for inspection by the user. See operation 606. The selection may be based on the scores or confidences calculated by the decision system. Which data element is selected may depend on the particular application and the point in the process of organizing the data set. For instance, at the beginning of the process, it may be beneficial to select a data element that has been organized with high confidence. This may validate and confirm at least one aspect of the organization by having the user confirm the choice the system made.

Later on, organized samples may be chosen whose scores or confidences are within a certain range. For instance, the method may be used to select data elements that do not fit well into the organization. By having the user examine those examples, the possibility may arise to correct mislabeled samples or to establish new aspects of the organization (in this scenario, by changing the label of an example to a different category or by adding a new category).

It may also be beneficial to select organized examples that were the most difficult to process by the decision making system. The intent may be to provide correctly labeled data elements for the decision making system that aid the system most in increasing its organization performance. In the example we use here, the system categorizing documents may be based on an SVM that operates by establishing a hyperplane between positive and negative elements. The addition of a difficult example (one that is close to the separating hyperplane) may have the most effect on the placement of the hyperplane, and may affect the system the most.

After the selection of the relevant data element or data elements, all or parts of the data elements may be displayed to the user. See operation 608. Depending on the application and the particular properties of the data elements, the amount of information that is output to the user may vary. For instance, if the task is to organize a set of documents in categories, the system may output either the whole document or just the initial few paragraphs together with the last few paragraphs. In other applications, the data output to the user may have to comprise even more than the whole data element. For instance, if the task is to establish an automatic extraction system then the data element itself (the field to be extracted) may be displayed together with the document or page that contains it, or even the data element itself together with other data elements for comparison.

The user may then inspect the data element being displayed and the organizational label it has received, and either confirm, negate, or modify the decision of the system. See operation 610. One exemplary way of interaction may be to suggest either a confirmation or negation. That way, the user may only have to make a binary decision which requires much less cognitive load than making a categorical decision involving choice among a possibly large number of categories. For instance, if the system currently thinks a document belongs to category A, the user may only need to confirm the document as being of that category or to negate the assignment. In one embodiment, the user may not have to identify the correct category; this task may be done later automatically with high confidence by the system.

Additionally, the decision or decisions of the user are used to recreate or update the automatic decision making system. See operation 612. Since the identity of the data element the user inspected is now of a very high confidence, it may be confidently used in the creation of the decision system. As an option, the recreated or updated decision making system may be organized again, this time incorporating the prior confirmation, negation, or modification of the user to the decision of the system.

The process of creating or updating the automatic decision making system, organizing data elements, selecting data elements for inspection, and manually confirming or correcting the automatically derived organization continues, and in the end results in a data set that is fully organized. Some benefits derived from this process may be that the user only is required to make easy binary decisions, that the user most likely will not have to inspect all or even a large portion of the data elements, and that the user does not have to be highly skilled in the architecture of the system or the detailed design of the organizational patterns.

Figure 7:
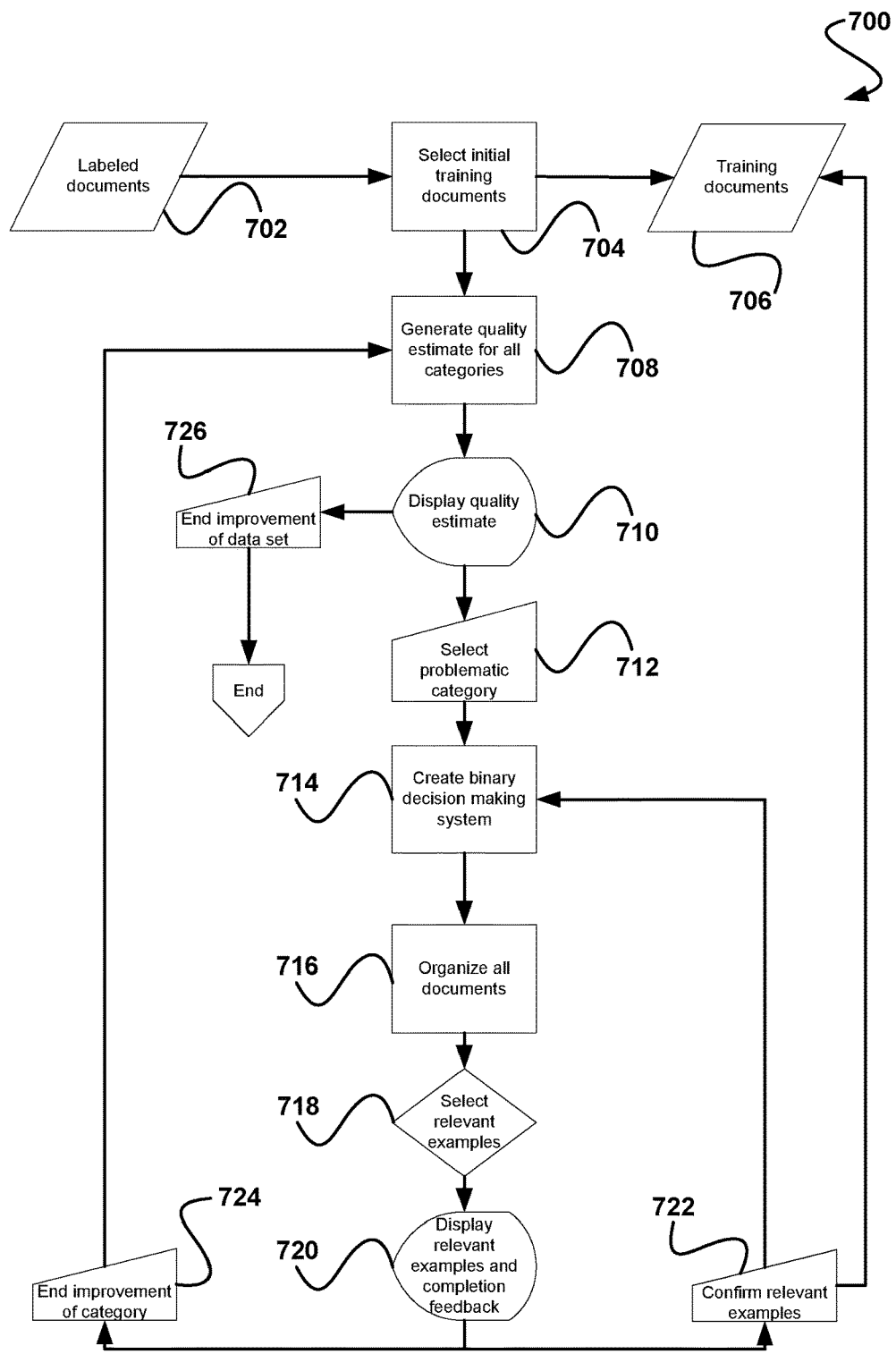
FIG. 7 illustrates a method for organizing data sets, in accordance with still another embodiment.

FIG. 7 illustrates a method 700 for organizing data sets, in accordance with still another embodiment. As an option, the method 700 may be implemented in the context of the architecture and environment of FIGS. 1-6. Of course, however, the method 700 may be implemented in any desired environment. Yet again, it should be noted that the aforementioned definitions may apply during the present description.

The input for the method 700 may include a set of documents that have been previously labeled. One embodiment assists a user in cleaning up this data set. The document can be electronic documents (e-mail messages, text processor documents, or the like), or they can be text recognized by OCR from paper documents that have been scanned. See operation 702.

Additionally, as shown in operation 704, the apparatus selects an initial subset of training documents from the labeled set. Representative documents of each category are selected. Those documents are used as initial training data and stored in operation 706.

Further, as shown in operation 708, the system generates an overview of the quality of the category assignments for the data set. The exact quality measure is irrelevant, and could be any common measure such as accuracy, precision, recall, f-score or the like. The models prepared during the quality estimation are created using a statistical learning algorithm. When the system first performs this step, it uses the initial training examples selected in operation 704. Later, in operation 722, those documents are augmented and/or replaced by manually confirmed examples.

Further still, in operation 710 the quality estimate is displayed. The user is able to assess the quality of the classification system on a macroscopic level (i.e. indicating the overall performance) as well as on a microscopic level (i.e. how well is the system doing for particular categories). If the user is satisfied with the current state, the iterative process of labeling and quality estimation can be exited via a command in operation 726, thereby exiting the method 700.

As shown in operation 712, if the user decides that at least one category should be improved, a category for improvement can be selected.

Additionally, as shown in operation 714, the system creates a binary model whose function is to decide whether a document is a member of the category or not. The learning algorithm uses the training examples currently stored by operation 706, using the examples from this category as positive samples and the examples from all other categories as negative samples.

As shown in operation 716, the binary model resulting from operation 714 is used to classify all documents remaining in this category that have not yet been labeled by the user.

Furthermore, as shown in operation 718, the system selects relevant examples based on the classification scores or confidences assigned to the documents processed in operation 716. In the preferred embodiment, the system may first select a few documents that are likely members of the category; this helps the user getting familiar with the category and manifests the positive examples. In later iterations, likely non-members may be selected to eliminate examples that were possibly mislabeled. Even later, examples may be selected that are currently difficult to classify (refer to FIG. 8).

Also, as shown in operation 720, the examples selected in operation 718 are displayed for confirmation, reassignment, or negation. In addition to the examples, the system may also display a measure of how well the system is able to differentiate between members and non-members of the class. Several different algorithms can be used to establish such a measure, the easiest being to calculate the accuracy on the training set. The display of this measure indicates to the user the point at which more labeling effort will not likely improve the category, thereby further reducing the manual work load.

As shown in operation 722, the user inspects the examples displayed and may initiate several operations for each. For example, a document may be confirmed as being correct and may become a positive example for further iterations. A document may be rejected, and may become a negative example for further iterations. This represents an efficient workflow and emphasizes the binary character of decisions to be made. Moreover, the user might decide to reclassify the document, an action that has merit mostly in situations with a small number of categories. All decisions made by the user are reflected in the current set of training documents stored by operation 706. At any point during the labeling the user might decide to abort the labeling effort and enter the next iteration of training, classification, selection, and labeling at operation 714.

In addition, in operation 724, if the user decides that the category has been improved sufficiently, based on the completion feedback in operation 720, the immediate iterative loop can be exited. The system returns to operation 708, generating a new quality overview of all categories used in the system. Then, the user might decide to improve another category, or the quality of the system might be deemed sufficient, and the workflow can be exited.

Figure 8:
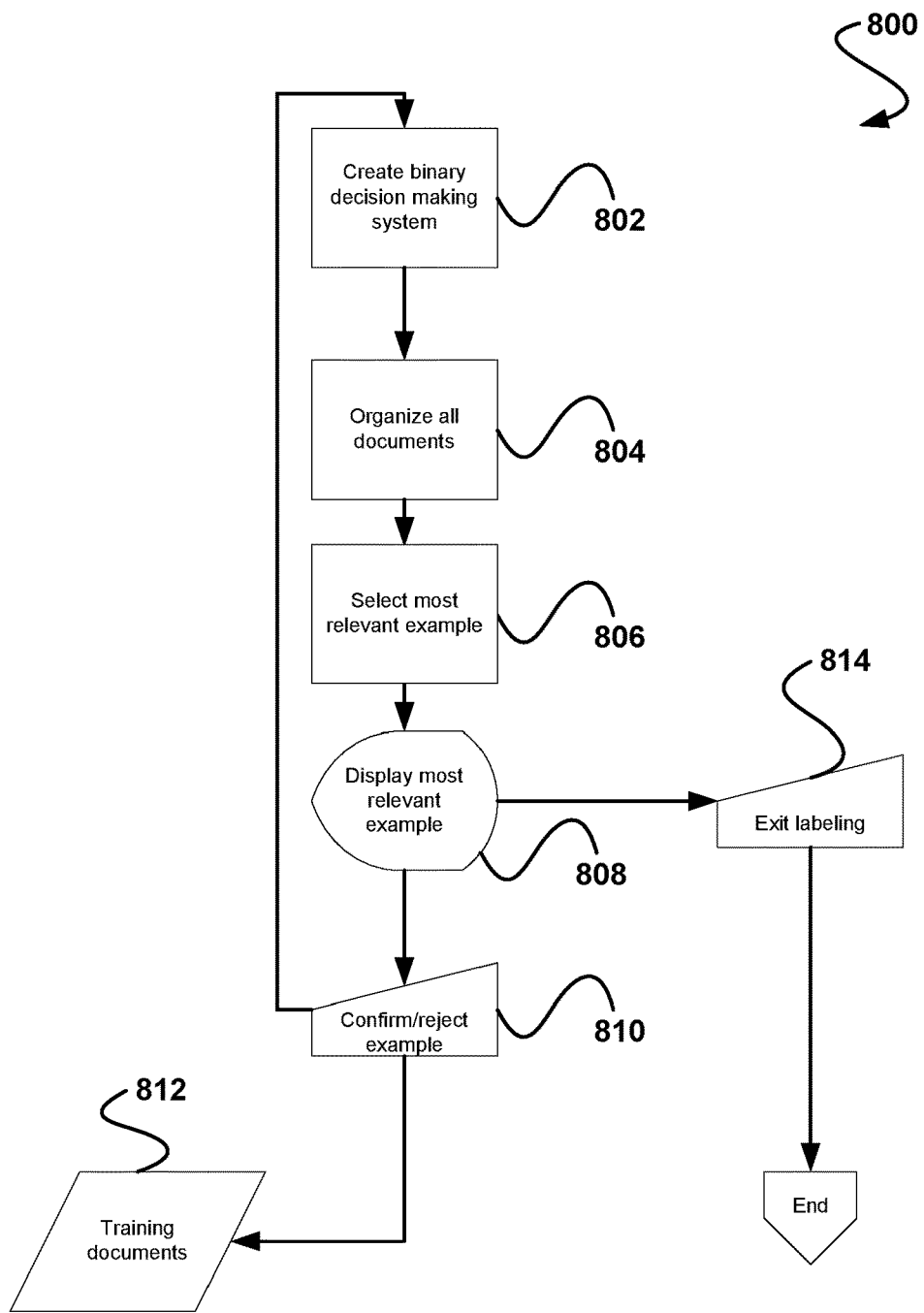
FIG. 8 illustrates a method for confirming or rejecting a most relevant example, in accordance with another embodiment.

FIG. 8 illustrates a method 800 for confirming or rejecting a most relevant example, in accordance with another embodiment. As an option, the method 800 may be implemented in the context of the architecture and environment of FIGS. 1-7. Of course, however, the method 800 may be implemented in any desired environment. Yet again, it should be noted that the aforementioned definitions may apply during the present description. In one embodiment, the method 800 may be used instead of the inner iterative process shown by operations 708-726 in FIG. 7.

As shown in operation 802, a binary classifier is learned based on the existing training documents. Documents that are members of the current category are used as positive examples; documents from other categories are used as negative examples. As an option, the current training documents from operation 706 in FIG. 7 may be used in the method 800 as well.

Additionally, the binary model resulting from operation 802 is used to classify all documents remaining in this category that have not yet been labeled by the user. See operation 804.

As shown in operation 806, the system selects the most relevant example. This is the document that was most difficult to classify, whose score is closest to the boundary between a positive decision and a negative decision. This document is relevant in that a manual decision about it adds a significant amount of knowledge to the training set, and will make the classifier a better decision instrument.

In operation 808, the selected example is displayed to the user. In operation 810, the user either confirms the example as being a correct member of the class or as not belonging to the current category. In the interest of efficiency, no other options (e.g. reclassification) are presented. The choice the user has to make is purely binary. Such a decision can be made with great speed and low cognitive load. The confirmation decision is recorded in the set of training examples in operation 812. Immediately after labeling a single example, the iterative loop of training, classification, selection and labeling is entered again.

Alternatively, the user might decide that enough relevant examples have been labeled (or the system might decide that such is the case). The iterative loop is exited in operation 814. As an option, the method illustrated in FIG. 7 may be resumed at operation 708.

Many times, applications for document transformation target several different user goals. One goal may be classification. For example, an unknown document (a sequence of scanned images from paper, an email, an electronic document) may enter a system, and the system may decide to which of many different categories (e.g., tens or hundreds) the document belongs.

Another goal may be separation. For example, the input to a system may be a stream of scanned images from paper documents, and the task of the machine may be to decide where one document ends and another one begins. This may be done in combination with classification, so that the output is a sequence of documents, each of them containing one or more pages, with a category assignment.

Yet another goal may be information extraction. For example, a machine may be tasked with detecting and labeling relevant parts of the text in a document (e.g. the SSN of a mortgage applicant, the address of a buyer, or the line items in an invoice).

One of the most potent mechanisms to perform these tasks (in particular classification and separation) relies on learning algorithms for statistical classification. In one embodiment, there are two distinct phases to this approach.

The first phase includes the learning (or training phase). A set of documents relevant for the task may be prepared by (or in cooperation with) the customer. The training document set may define the decisions the system is expected to make. For classification, this may be a set of documents with predetermined category labels; for separation, a sequence of pages (a batch) may be prepared that is marked with document boundaries and labels. A special learning algorithm may be employed that uses these examples to create a model of the problem. In one embodiment, SVMs may be used for this task.

The second phase includes the runtime phase. The model prepared earlier may be used to process new, unknown documents that enter the business after deployment of the application. The system may examine each new document (or stream of pages) and returns a classification result (a category name, for instance) and a score that indicates how certain the system is of its decision.

One time-consuming and expensive task for this mode of operation may be the preparation of the set of training examples that enable the systems to learn how to make decisions. For example, forty examples may be required for each category, and frequently the customer provides hundreds of examples per category. If the customer already has a back-end system for document storage in place, they may download a large number of samples from their document storage system (which is relatively easy). If the customer is just establishing a classification/separation system, they may use in-house expertise to manually label the required sample documents. This may require substantial effort, and can take months to accomplish.

In either case, in some circumstances it may be required that the quality of the training documents be very high, meaning that the documents are relevant and representative for their category, and that the training set is clean. Clean may mean that there are no mislabeled documents, i.e. we can absolutely trust a category assignment from the customer. Clean may also signify that the documents are free of extraneous pages. Extra pages may include fax cover sheets or separator sheets left over from manual operation, for instance. Those pages may degrade the performance of the learning solution, and they may need to be marked appropriately in order to compensate for their presence.

Impurities like this may be introduced by a number of factors. For instance, human labelers may not be perfectly consistent in their choices. Or, a back-end document storage system might have grown over years, and category shift might have happened.

To ensure the high quality of the training corpus, an integrator or other professional may examine the data and correct all mistakes present. In addition, these persons may have undergone a significant amount of training in the use of the system, which helps them select and label examples that are relevant to the task. Depending on the size of the problem, this also may take months of effort.

The result of this situation is that there may be a lot of highly skilled manual labor involved in the preparation of training documents for automated solutions. This may slow down deployment of products significantly and can be extremely expensive.

In one embodiment, very few labeled examples (one or two) are used in addition to an automatic algorithm which finds other suitable examples in a data set, that are in turn are verified by the user. One advantage may be that a user does not have to hand-label many examples that contribute very little to the quality of the solution, but that they only label relatively few, highly relevant examples, and that the system finds those example for the user. This may result in a much faster deployment of a better solution for classification or separation that can be used by non-experts in the field of trained methods and classification.

Application to Separation Problems

The iterative processes described above may result in a fully organized data set. However, one issue that needs to be addressed is the question of how many data elements the user has to inspect manually. One goal may be to minimize this number while still resulting in a decision making system that is performing with high accuracy. Another potential issue is the possible existence of aspects of the organization that are inherently hard to learn by the decision making system. For instance, in a document categorization problem, there could be two categories that are very close together compared to the other categories.

One embodiment of the present invention may address these issues by monitoring the quality and stability of the decision making system. The quality of the system may be measured by any of the established performance criteria usually attributed to such systems. Examples include error rate, precision, recall, etc. Depending on the amount of data present, these measures may be calculated on the data used to create the system (training data), or a separate subset of data could be used (holdout set). At any given point in the process, the quality measure may give an indication of the performance of the system. The stability includes a measure that indicates how much the underlying decision system changed between iterations. The stability includes a measure of the dynamics of the system and is therefore attached to the iterative nature of the process.

The stability may be calculated in a variety of different ways. For instance, the amount of change in the internal data structures of the system may be taken as a measure of change. In the case of a decision system based on separating hyperplanes (e.g. SVMs), the distance between the hyperplanes in two consecutive versions of the decision system may be used. Or, the stability may be measured as the fraction of the data elements for which the decision of the system changed between iterations.

The monitoring of quality and stability allows the system to automatically detect the following two situations: alerting the user when additional manual work is not likely to increase the performance of the system, and alerting the user (or performing internal changes) if difficult aspects of the organization are present.

Both situations may arise over time in a dynamic organizing process when a user confirms, negates or modifies organizational properties of data elements that were either labeled earlier or that were proposed by an automatic system. In this sense, the detection method may relate to the process described earlier, where an organization was induced over a data set by interaction between a system and a user. However, this need not be the case: any other method by which knowledge is incrementally added into the organization of a data set may be used.

The detection of the situation in which the user should not add more data to the organization may be performed indirectly. For example, the system may detect when the quality of the decision system does not improve significantly over a period of time (e.g., a number of iterations in the dynamic process). If the stability of the system does not change significantly as well, the system may conclude that the quality is not likely to improve by adding more examples inspected by the user. In order to provide better feedback to the user, the quality and stability may be displayed in a graph whose x axis represents time (e.g., the number of iterations performed, the number of data elements inspected, etc.) and whose y axis represents the level of quality and stability. Preferably, the level of quality that is achieved by the system is within some predefined quality boundaries. Depending on the absolute level of quality, the system might already have reached a performance high enough for the purpose of the decision system. If this is the case, the method may reduce the amount of manual labor involved and increase the quality level of the resulting decision system.

If, on the other hand, the quality is deemed too low, the system may autonomously modify the operating parameters of the decision system in an attempt to allow further increase in quality. One possibility is to change the decision function or the input representation used in the decision system. For instance, assume an SVM is used as the decision system. In this case, the kernel used in the SVM could be changed (e.g. change to a Gaussian kernel from a linear one). An example for changing the input representation would be to use the frequencies of character or word n-grams instead of single words to characterize input documents in a document classification problem. Alternatively, the system could attempt to use different or additional types of features to characterize the input. For instance, instead of words in a document (e.g., content-based characterization, etc.) the system could use the distribution of color on a page (e.g., layout-based characterization, etc.).

Another method to attempt to overcome the stagnation of quality improvements could be to change the organization itself that is to be learned. Such a change could address a situation in which two aspects of the organization are too close together to be reliably distinguished from each other in the presence of all other aspects. One embodiment of the system may try to identify such pairs, for instance by analyzing incorrect organization decisions on a hold-out set. The change made in the organization would then include virtually merging these two aspects into one new aspect that contains the samples from both original aspects. As a result, the union of the aspects may be easier to decide on by the automatic decision system. This may lead to a higher quality for the modified organization. If this modified organization still meets the requirements of the application and the user, such change is beneficial.

If, however, there is a valid reason for the distinction between the two aspects of the organization, the system may need to deploy a second decision making system. The original decision making system with the modified organization may deliver incorrect results for the virtual organization aspect. The result for a particular data element of this aspect can only be interpreted as being of either of the two original aspects. However, the system may not be able to decide which one. To resolve this problem, in one embodiment, the second decision making system may be created using the original samples marked with the two original aspects. In this way, deciding the binary question between the two original aspects may be easier to do in the absence of all the other aspects. Any result from the first decision making system that indicates that the data element is of the virtual new aspect may then undergo processing by the second decision system to result in either one of the two original aspects. The quality of these two decision systems combined may be higher than that of the original, single decision system.

Self-Diagnosing and Auto-Correction Capability

In one embodiment, the system may be able to detect two situations during operation that limit the quality of the resulting solution. For example, the quality of the solution for the current category may level out below a desirable threshold of quality. The quality of the solution is constantly monitored and updated with every decision made by the user. In addition to a common quality measure (e.g. accuracy), the amount of change in the decisions of the system for the data under consideration is also measured (called stability). If both curves level out even though the user labels more data, the system may infer that the quality of the category is not likely to change much anymore, and can assess whether or not the quality achieved is sufficiently high.

In another example, the data in the solution may be difficult to handle using a particular configuration. For instance, this might be the case if the category contains samples that are close in content to some other category, which exceeds the capability of the classifier to reliably distinguish between categories. The signal for this situation may be an oscillation in the quality and stability estimates for a category, which can be further enhanced by automatically inspecting confusion data between categories.

In this case, the system can change its approach to the classification procedure. Depending on the situation, it may decide to increase the complexity of the feature space used. This may increase the ability of the system to use fine-grained distinction between the data of different categories and augments the resolution of the classifier.

In another example, the system may decide to use more complex decision functions to distinguish between different categories. For instance, if a linear decision boundary was used initially, a higher order function may be used to separate categories. Again, this may increase the resolution of the classifier.

In yet another example, the system may decide to alter the hierarchy of categories used. In certain cases, it may prove advantageous to virtually merge two categories during a first classification pass. Thus, two categories that are difficult to separate may be treated as if they were one and the same category, which may increase the accuracy of the modified classifier. In a second stage, the system may then use the same or a modified classifier and the same or a modified feature space to distinguish elements of the original categories in the virtually merged category. This may, as in the previous cases, lead to an increased accuracy of the overall solution.

In yet another embodiment, all the above measures may be transparent to the user. In previous systems, changes like these were manually undertaken by the user of the system. This required a sophisticated user who had undergone a significant amount of training in the use of the system and its underlying models. Using the preferred embodiment of the present invention, the system may modify its behavior automatically and without knowledge or initiation by the user. Thus, a user who has no knowledge of classification, data management, and the precise design of the system may be able to develop highly accurate solutions.

Find Extraneous Pages

One preferred embodiment outlined above focused on the problem of classifying complete documents. In another embodiment, the method may be used to transform documents, in particular documents ingested by optically scanning and performing OCR on a sequence of paper pages, such that their internal quality is high.

In a paper-driven environment, documents may frequently be impure. Of particular importance are impurities that may interfere with successfully separating such documents and classifying them into a category within a document type hierarchy. Examples for such pages are fax cover sheets, separator sheets, various types of short legal attachments, etc.

In one embodiment, the classification is not based on complete documents, but on individual pages within documents. Positive examples may include extraneous pages, while negative examples may include valid pages that belong into documents of a certain category. The method of FIG. 7 may be used in one embodiment. Focusing on one particular category at a time is not strictly necessary in this embodiment. However, for reasons of lowering the cognitive load and increasing the efficiency of the labeling process, working with one category is advantageous.

Find Separation Points

In another embodiment, the user may verify and/or correct separation points in a batch provided by a customer. For example, a customer may deliver a sequence of page images (a batch), in which they have marked document boundaries (points between pages where one document ends and the next one starts). There may be errors in labeling those separation points, which reduces the quality of the trained system. The method and apparatus of various embodiments may be used to find likely incorrect separation points.

The method of FIG. 7 may be used in one embodiment. Positive examples may include valid separation points between documents. Negative examples may include points between pages within a document. The display of the relevant examples selected from the data shows documents in context in order to enable the user to inspect document boundaries. Focusing on one particular category at a time may not be strictly necessary in this embodiment. However, for reasons of lowering the cognitive load and increasing the efficiency of the labeling process, working with one category may prove advantageous.

Building a Hierarchy

The aforementioned embodiments include situations where data was already labeled by a customer, but was likely to have a certain amount of errors in it. The method and apparatus of various embodiments can also be used to build a new hierarchy of document types or to augment an existing hierarchy.

In order to build a hierarchy from scratch, one starts with a single document that the user labels as a new document type. From there, more documents of the same type can be found. After the user is satisfied with the category, they may examine documents that do not belong in the category, and establish a new category for one of those documents. This cycle can be repeated until all data is labeled and the hierarchy is complete.

(Legal) Discovery

One aspect of embodiments of the current invention is to take very few manually-labeled examples and use a classifier to return more examples like it. This can be used in discovery scenarios where a user wants to find documents with certain user-defined characteristics. After having found a small number of interesting documents, the user may use the method and apparatus described herein to create a ranking of all documents in the data set. Higher ranked documents are supposedly more useful or interesting than lower ranked documents. After each decision by the user, the ranking may be updated to reflect the additional knowledge that the user created by confirming (or rejecting) a document.

In another embodiment, this may be extended to segments of documents, such that a user marks as interesting a few passages in a few documents, and the system tries to find documents that are similar to the marked passages. Note that this may not be a search in the traditional sense, but a more sophisticated classification schema that gets more competent with use.

Finding the First Positive and Negative Example Automatically

In one approach, classification may rely on very few labeled documents; however, at least one positive and one negative example should be labeled in order to be able to apply the mechanism. It may be easy for the user to find a positive example, since it can be assumed that the customer labeling is mostly correct (for instance in the application of finding mislabeled documents). However, finding a negative example might involve browsing through a large number of documents, since mistakes might be rare. One of the main advantages of classification using fewer initial documents would then be largely negated.

In order to solve this problem, the system may come up with a reasonable guess on what a negative example is. For example, suppose a user has labeled a positive example. Then the system may examine all other documents and select the one that is farthest away from the positive example. (Distance is measured in the usual way for document content vector applications). This may be the initial candidate for a negative example, and a ranking can be produced. Then, it may be likely that the user finds a negative example, and the initial guess can be discarded. The system may now rely solely on explicitly labeled documents.

If no document is yet labeled, the system may not be able to display a ranking of documents, since it may not be able to create a classifier due to the lack of training examples. In order to overcome this, the system may also try to find a likely positive example. Again, using the assumption that the data the customer provided is mostly correct, the system may choose a document as positive example that is in the center of all documents for the category, implying that if there are many documents that are very close in content, they are likely to be correct.

The description herein is presented to enable any person skilled in the art to make and use the invention, and the description is provided in the context of particular applications of the invention and their requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments described, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such as hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing either a combination of microprocessors or other specially designed application-specific integrated circuits, programmable logic devices, or various combinations thereof. In particular, methods described herein may be implemented by a series of computer-executable instructions residing on a storage medium such as a carrier wave, disk drive, or computer-readable medium. Exemplary forms of carrier waves may be electrical, electromagnetic or optical signals conveying digital data streams along a local network or a publicly accessible network such as the Internet. In addition, although specific embodiments of the invention may employ object-oriented software programming concepts, the invention is not so limited and is easily adapted to employ other forms of directing the operation of a computer.

The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc. Further, the present invention can be implemented in software that can be downloadable or otherwise transferable from one computing device to another via network, wireless link, nonvolatile memory device, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for cleaning up a data set having a possible incorrect label, the method comprising:
    selecting a plurality of training documents;
    estimating a quality of an organization of a plurality of categories;
    determining whether the quality of the organization is greater than a predetermined quality threshold;
    in response to determining the quality of the organization is less than or equal to the predetermined quality threshold:
        recreating or updating a binary decision model for a problematic category;
        reorganizing a plurality of documents in the problematic category using the recreated or updated binary decision model;
        selecting one or more relevant examples from among the plurality of reorganized documents in the problematic category;
        receiving user feedback regarding the one or more relevant examples, the user feedback comprising one or more of a confirmation, a negation, and a modification of the one or more relevant examples; and
        determining whether the quality of the organization of the plurality of categories is greater than the predetermined quality threshold.

2. The method of claim 1, comprising, in response to determining the quality of the organization is less than or equal to the predetermined quality threshold, creating or selecting the problematic category within the organization.

3. The method of claim 2, comprising, in response to determining the quality of the organization is less than or equal to the predetermined quality threshold, creating or updating a binary decision model for the problematic category.

4. The method of claim 3, further comprising organizing a plurality of documents in the problematic category using the created or updated binary decision model.

5. The method of claim 4, further comprising selecting one or more relevant examples from among the plurality of organized documents in the problematic category.

6. The method of claim 5, further comprising receiving user feedback regarding the one or more relevant examples, the user feedback comprising one or more of a confirmation, a negation, and a modification of the one or more relevant examples.

7. The method of claim 6, further comprising determining whether the quality of the organization of the plurality of categories is greater than the predetermined quality threshold.

8. The method of claim 1, further comprising, in response to determining the quality of the organization is greater than the predetermined quality threshold, terminating the cleaning up of the data set.

9. A computer system comprising a processor, and logic embodied therewith, the logic executable to cause the computer system to clean up a data set having a possible incorrect label by:
    selecting a plurality of training documents;
    estimating a quality of an organization of a plurality of categories;
    determining whether the quality of the organization is greater than a predetermined quality threshold;
    in response to determining the quality of the organization is less than or equal to the predetermined quality threshold:
        recreating or updating a binary decision model for a problematic category;
        reorganizing a plurality of documents in the problematic category using the recreated or updated binary decision model;
        selecting one or more relevant examples from among the plurality of reorganized documents in the problematic category;
        receiving user feedback regarding the one or more relevant examples, the user feedback comprising one or more of a confirmation, a negation, and a modification of the one or more relevant examples; and
        determining whether the quality of the organization of the plurality of categories is greater than the predetermined quality threshold.

10. The computer system of claim 9, comprising logic executable to cause the computer system, in response to determining the quality of the organization is less than or equal to the predetermined quality threshold, to create or select a problematic category within the organization.

11. The computer system of claim 10, comprising logic executable to cause the computer system, in response to determining the quality of the organization is less than or equal to the predetermined quality threshold, to create or update a binary decision model for the problematic category.

12. The system of claim 11, further comprising logic executable to cause the computer system to organize a plurality of documents in the problematic category using the created or updated binary decision model.

13. A computer program product comprising a non-transitory computer readable medium having computer code embodied therewith, the computer code executable to cause a computer to perform a method for cleaning up a data set having a possible incorrect label, the method comprising:
    selecting, by the computer, a plurality of training documents;
    estimating, by the computer, a quality of an organization of a plurality of categories;
    determining, by the computer, whether the quality of the organization is greater than a predetermined quality threshold;
    in response to determining, by the computer, the quality of the organization is less than or equal to the predetermined quality threshold:

recreating or updating, by the computer, a binary decision model for a problematic category;

reorganizing, by the computer, a plurality of documents in the problematic category using the recreated or updated binary decision model;

selecting, by the computer, one or more relevant examples from among the plurality of reorganized documents in the problematic category;

receiving, at the computer, user feedback regarding the one or more relevant examples, the user feedback comprising one or more of a confirmation, a negation, and a modification of the one or more relevant examples; and determining, by the computer, whether the quality of the organization of the plurality of categories is greater than the predetermined quality threshold.

14. The computer program product of claim 13, comprising computer code executable to cause the computer, in response to determining the quality of the organization is less than or equal to the predetermined quality threshold, to create or select the problematic category within the organization.

15. The computer program product of claim 14, comprising computer code executable to cause the computer, in response to determining the quality of the organization is less than or equal to the predetermined quality threshold, to create or update a binary decision model for the problematic category.

16. The computer program product of claim 15, further comprising computer code executable to cause the computer to organize a plurality of documents in the problematic category using the created or updated binary decision model.

17. The computer program product of claim 16, further comprising computer code executable to cause the computer to select one or more relevant examples from among the plurality of organized documents in the problematic category.

18. The computer program product of claim 17, further comprising computer code executable to cause the computer to receive user feedback regarding the one or more relevant examples, the user feedback comprising one or more of a confirmation, a negation, and a modification of the one or more relevant examples.

19. The computer program product of claim 18, further comprising computer code executable to cause the computer to determine whether the quality of the organization of the plurality of categories is greater than the predetermined quality threshold.

20. The computer program product of claim 13, further comprising computer code executable to cause the computer, in response to determining the quality of the organization is greater than the predetermined quality threshold, to terminate the cleaning up of the data set.

* * * * *